US010625803B2

(12) United States Patent
Kwak

(10) Patent No.: US 10,625,803 B2
(45) Date of Patent: Apr. 21, 2020

(54) FRONT MOTORCYCLE MUDFLAP

(71) Applicant: Henry Hyun Kwak, Duluth, GA (US)

(72) Inventor: Henry Hyun Kwak, Duluth, GA (US)

( * ) Notice: Subject to any disclaimer, the term of this patent is extended or adjusted under 35 U.S.C. 154(b) by 39 days.

(21) Appl. No.: 15/961,655

(22) Filed: Apr. 24, 2018

(65) Prior Publication Data

US 2019/0054969 A1 Feb. 21, 2019

Related U.S. Application Data

(60) Provisional application No. 62/546,159, filed on Aug. 16, 2017.

(51) Int. Cl.
*B62J 15/04* (2006.01)
*B62J 15/02* (2006.01)

(52) U.S. Cl.
CPC ............... *B62J 15/04* (2013.01); *B62J 15/02* (2013.01)

(58) Field of Classification Search
CPC .............. B62B 9/16; B62J 15/04; B62J 15/02
See application file for complete search history.

(56) References Cited

U.S. PATENT DOCUMENTS

| | | | | |
|---|---|---|---|---|
| 3,778,086 A * | 12/1973 | Moore | B62D 25/188 | 280/851 |
| 4,043,568 A * | 8/1977 | Hollon | B62D 25/188 | 280/851 |
| 4,268,053 A * | 5/1981 | Toppins | B62D 25/188 | 280/154 |
| 4,627,594 A * | 12/1986 | Reed | B62D 25/188 | 248/632 |
| D290,593 S * | 6/1987 | Stahel | D12/185 | |
| 6,367,832 B1 * | 4/2002 | Vogel | B62J 6/005 | 280/152.1 |
| 9,004,513 B1 * | 4/2015 | Schacht | B62J 15/00 | 280/152.3 |

* cited by examiner

*Primary Examiner* — John D Walters
*Assistant Examiner* — James J Triggs
(74) *Attorney, Agent, or Firm* — Asgaard Patent Services, LLC; F. Wayne Thompson, Jr.

(57) ABSTRACT

A front mudflap that is mounted with or without the front fender of a motorcycle to block water, dirt, and debris includes a bracket, an elastic shield, a support plate, and at least one fastener. The elastic shield is positioned and mounted in between a shield attachment leg of the bracket and the support plate by the at least one fastener. A frame attachment leg of the bracket is mounted to a frame of the motorcycle by the fastening mechanism thus securing the front mudflap to the motorcycle in a horizontal manner. Since the front mudflap is not connected to the front fender, the front mudflap can function with or without the front fender by blocking water, dirt, and debris away from the motorcycle and the rider.

12 Claims, 7 Drawing Sheets

1
2
3
4

FRONT MOTORCYCLE MUDFLAP

The current application claims a priority to the U.S. Provisional Patent application Ser. No. 62/546,159 filed on Aug. 16, 2017.

FIELD OF THE INVENTION

The present invention relates generally to a motorcycle mud flap. More specifically, the present invention is a front motorcycle mudflap that can be mounted with the front fender or without the front fender to keep out debris from the front wheel.

BACKGROUND OF THE INVENTION

A motorcycle mudflap is used in combination with the front fender to protect parts of the motorcycle, riders, other vehicles, and pedestrians from flying debris that are thrown towards the motorcycle by the front wheel. The mudflap is typically made from a flexible material such as rubber that can withstand damages cause by the flying debris. Generally, the motorcycle mudflap is a rectangular sheet that suspends from the front fender or a small lip that attaches to the bottom of the front fender. Manufacture install front fenders and mudflaps are generally installed within the motorcycle to satisfy safety regulations and do not maximize the functionality of aspect of the mudflap. Specific motorcycle, such as bobbers and café racers, normally do not utilize front fenders as a stylistic feature to resemble and maintain authentic appearance. As a result, motorcycle riding can be dangerous as flying debris get thrown into the motorcycle and the rider during cruising and acceleration thus causing safety issues for the rider.

It is therefore an objective of the present invention to produce a front motorcycle mudflap which can be used to block water, dirt, and debris that would otherwise be thrown into the rider's face. The present invention is not suspended or mounted to the front fender, allowing all types of motorcycles to block flying debris. More specifically, the present invention is mounted to a frame of the motorcycle in a horizontal manner so that the present invention is able to function with or without the front fender. The present invention extends in between the front wheel and the frame thus blocking out water, dirt, and debris that are normally thrown towards the motorcycle and the rider. As a result, the present invention is able to effectively function as a front motorcycle mudflap.

DETAIL DESCRIPTIONS OF THE INVENTION

All illustrations of the drawings are for the purpose of describing selected versions of the present invention and are not intended to limit the scope of the present invention.

The present invention is a front motorcycle mudflap system that blocks water, dirt, and debris away from the rider. The present invention functions with or without utilization of a front motorcycle fender. The present invention comprises a front mudflap 4 and a motorcycle 1, wherein the front mudflap 4 is mounted to the motorcycle 1 to block thrown water, dirt, and debris. More specifically, the front mudflap 4 can function with or without the front motorcycle fender as the front mudflap 4 is not mounted to the front motorcycle fender. Even though the present invention can be utilized within variety of motorcycle designs, the present invention is preferably utilized within specific motorcycles that do not use the front motorcycle fender, such as bobbers and café racers, to establish stylistic feature and maintain authentic appearance.

Figure 1:
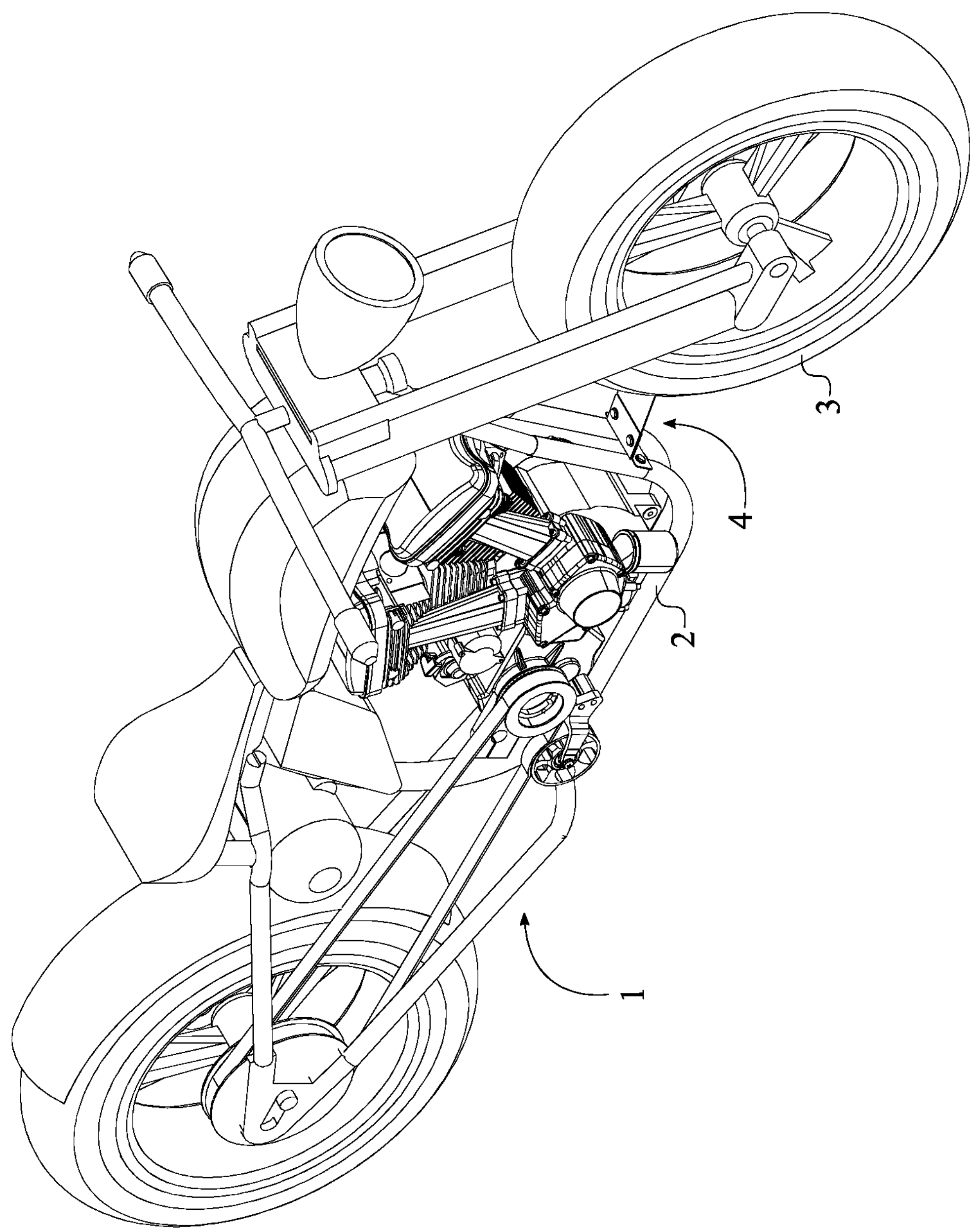
FIG. 1 is a perspective view of the present invention, showing the motorcycle and the front mudflap.
Figure 2:
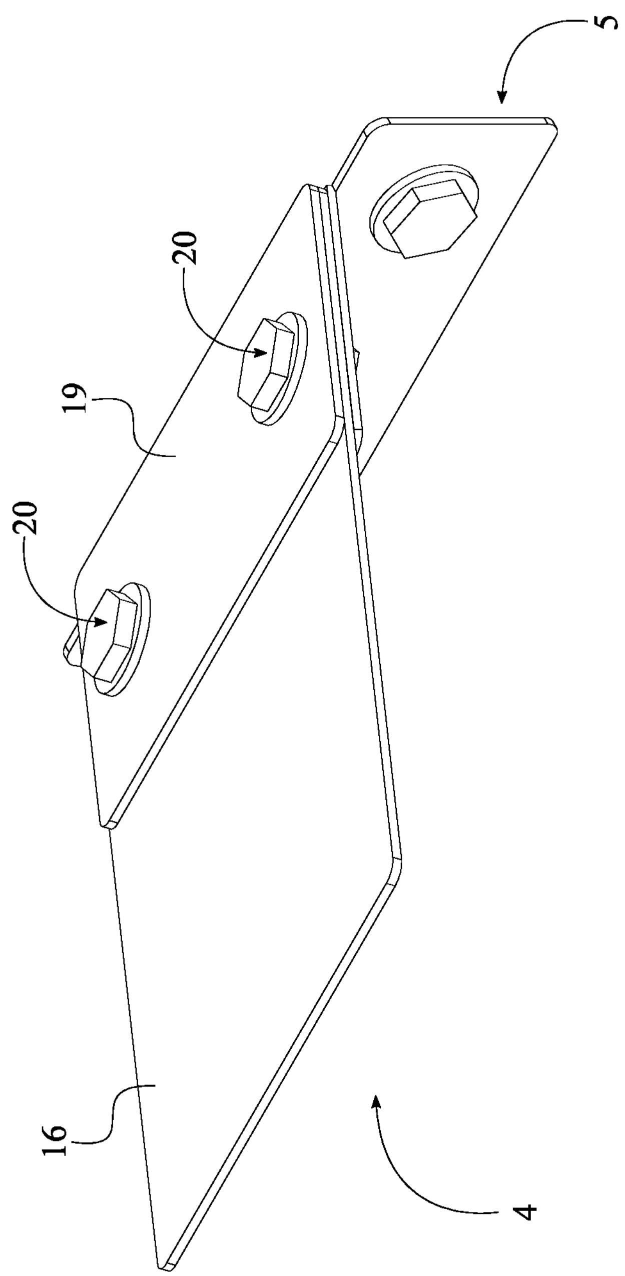
FIG. 2 is a front top perspective view of the front mudflap of the present invention.
Figure 3:
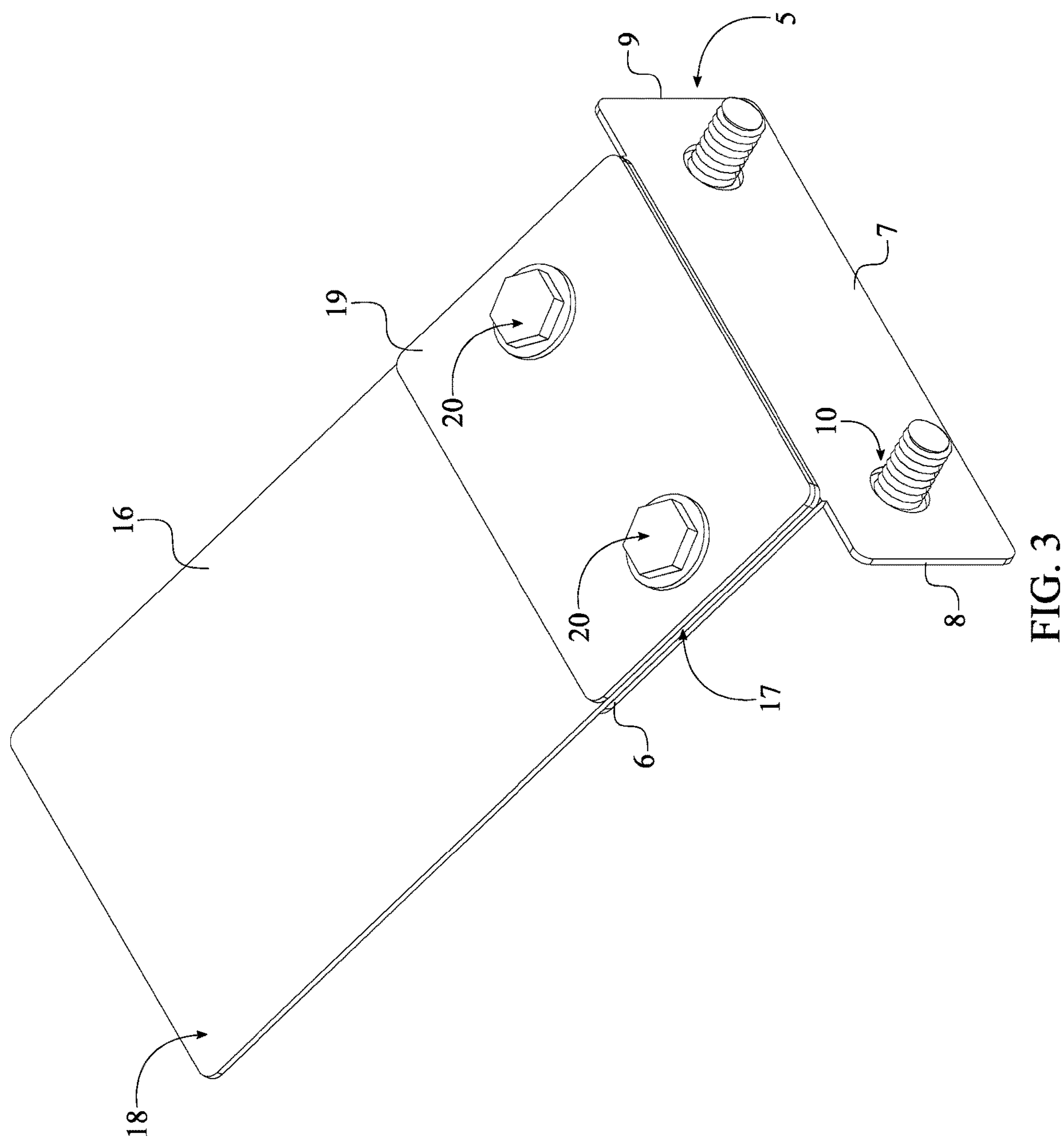
FIG. 3 is a rear top perspective view of the front mudflap of the present invention.
Figure 4:
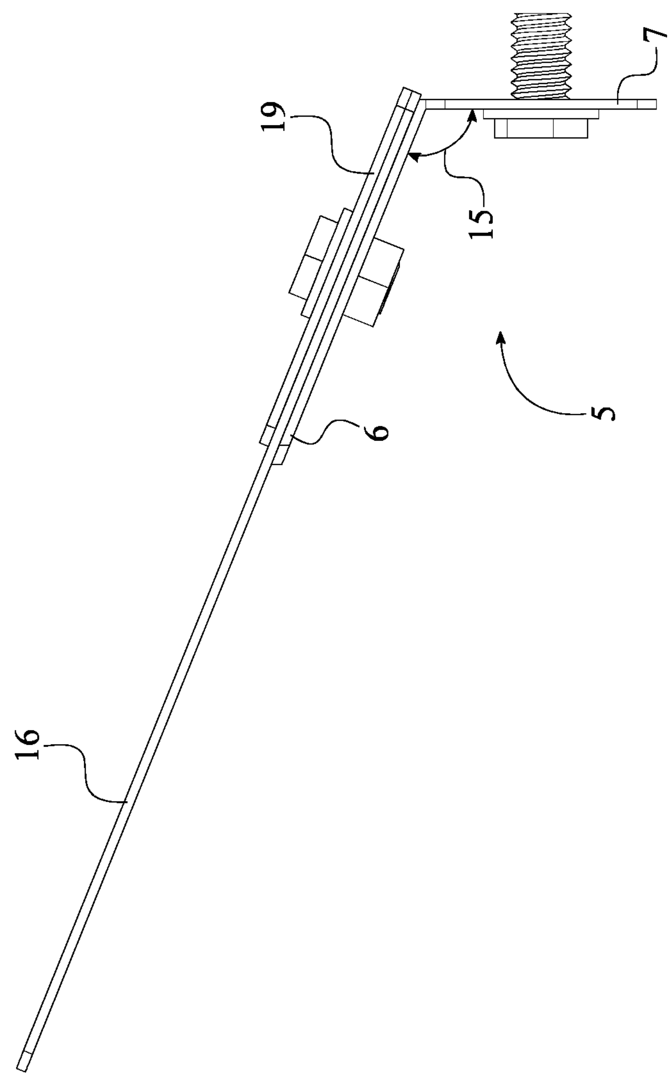
FIG. 4 is a side view of the front mudflap of the present invention, showing the obtuse angle between the frame attachment leg and the shield attachment leg.

The front mudflap 4, which blocks the water, dirt, and debris thrown into the rider, comprises a bracket 5, an elastic shield 16, a support plate 19, and at least one fastener 20 as shown in FIG. 1-3. The bracket 5 is generally formed into an angular shaped member so that the bracket 5 can function as the intermediary attaching member between the elastic shield 16 and the motorcycle 1. More specifically, the bracket 5 comprises a shield attachment leg 6, a frame attachment leg 7, and a fastening mechanism 10 as shown in FIG. 3-4. The shield attachment leg 6 is terminally connected to the frame attachment leg 7 at an obtuse angle 15, wherein a linear length of the shield attachment leg 6 is greater than a linear length of the frame attachment leg 7. The length difference between the shield attachment leg 6 and the frame attachment leg 7 provides sufficient surface area within the bracket 5 so that the shield attachment leg 6 can be firmly secure to the elastic shield 16, and the frame attachment leg 7 can be secured to the motorcycle 1. The front mudflap 4 can be mounted to the motorcycle 1 in a horizontal manner with respect road surface. In other words, the bracket 5 allows the elastic shield 16 to be mounted parallel to the ground surface so that the elastic shield 16 is able to block out the thrown debris. In order to attain the best positioning for the front mudflap 4, the obtuse angle 15 is preferably set to 112 degrees within the preferred embodiment of the present invention.

The elastic shield 16 that physically blocks debris that are thrown at the rider is preferably made from high density rubber or any other types of elastic material that can withstand the impact of thrown debris, minimizing vibration and sound. In reference to FIG. 3, the elastic shield 16 is positioned in between the shield attachment leg 6 and the support plate 19 so that the elastic shield 16 can be terminally mounted to the shield attachment leg 6 and the support plate 19 by the at least one fastener 20. More specifically, a proximal end 17 of the elastic shield 16 is positioned in between the shield attachment leg 6 and the support plate 19 thus pressing the elastic shield 16 in between the shield attachment leg 6 and the support plate 19. As a result, the at least one fastener 20 can secure the proximal end 17 of the elastic shield 16 to the bracket 5 and the support plate 19.

Figure 5:
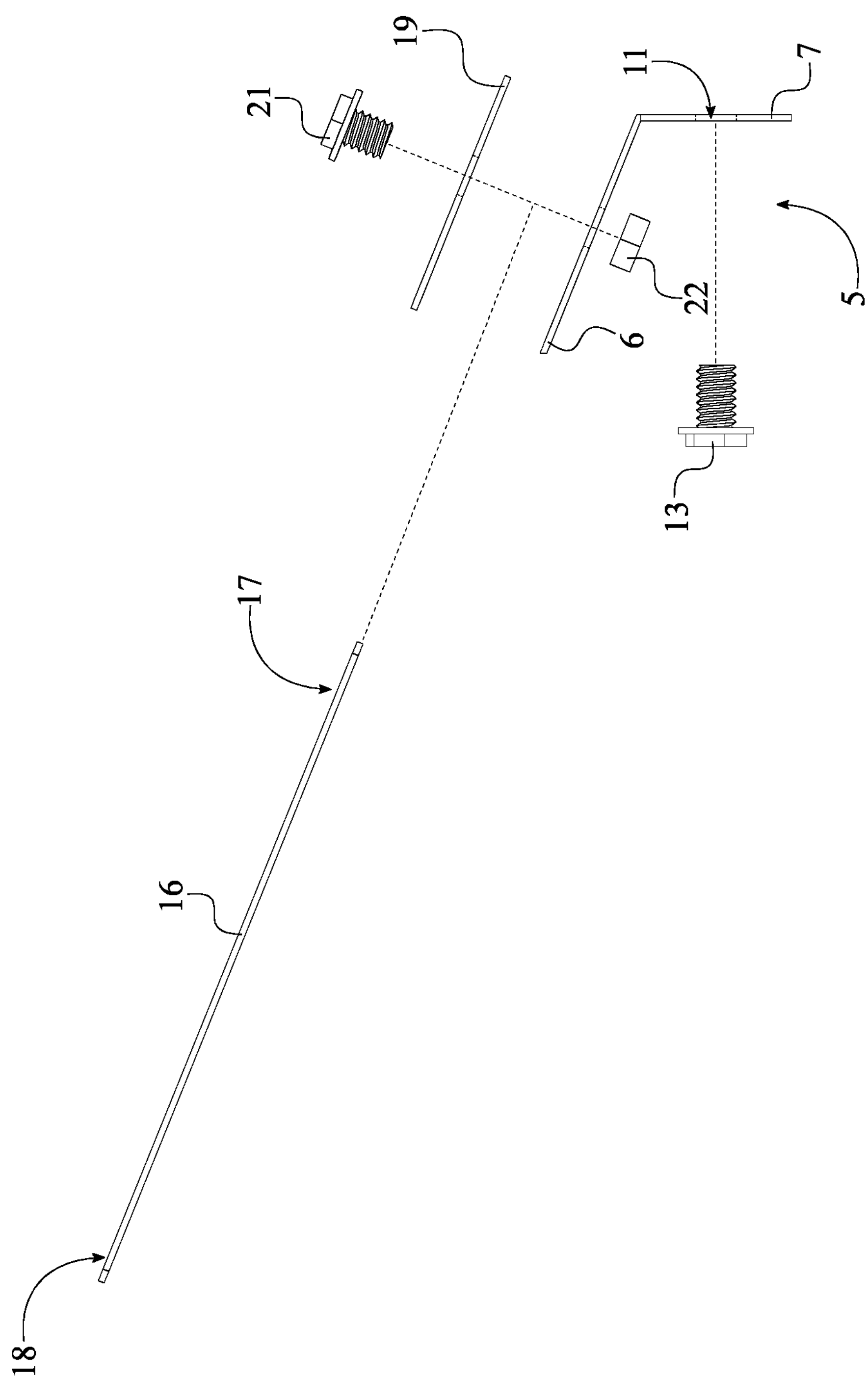
FIG. 5 is an exploded side view of the front mudflap of the present invention, showing the first hole and the first fastener.
Figure 6:
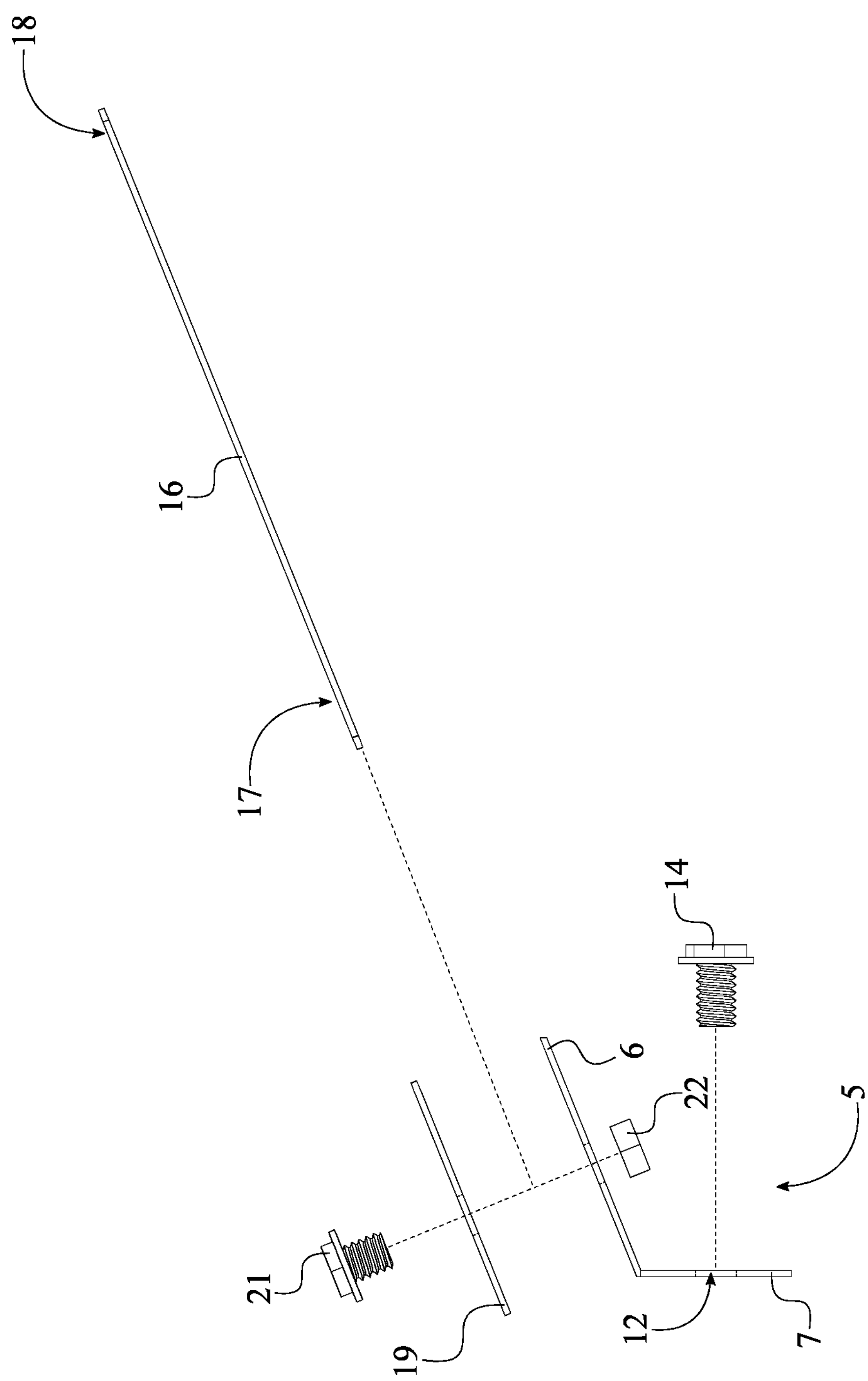
FIG. 6 is an exploded side view of the front mudflap of the present invention, showing the second hole and the second fastener.

In reference to FIG. 5-6, the at least one fastener 20 comprises a male fastener 21 and a female fastener 22. The male fastener 21 traverses through the elastic shield 16 and the shield attachment leg 6 from the support plate 19. The female fastener 22 is tensionally engaged to the male fastener 21 from the shield attachment leg 6. As a result, the male fastener 21 and the female fastener 22 are able to respectively press the support plate 19 and the shield attachment leg 6 onto the elastic shield 16 from each end, applying uniform pressure throughout the proximal end 17 of the elastic shield 16. Even though the preferred embodiment of the present invention utilizes the male fastener 21 and the female fastener 22 as the at least one fastener 20, the present invention can use any other types easily detachable fasteners to secure the elastic shield 16 and the bracket 5.

Figure 7:
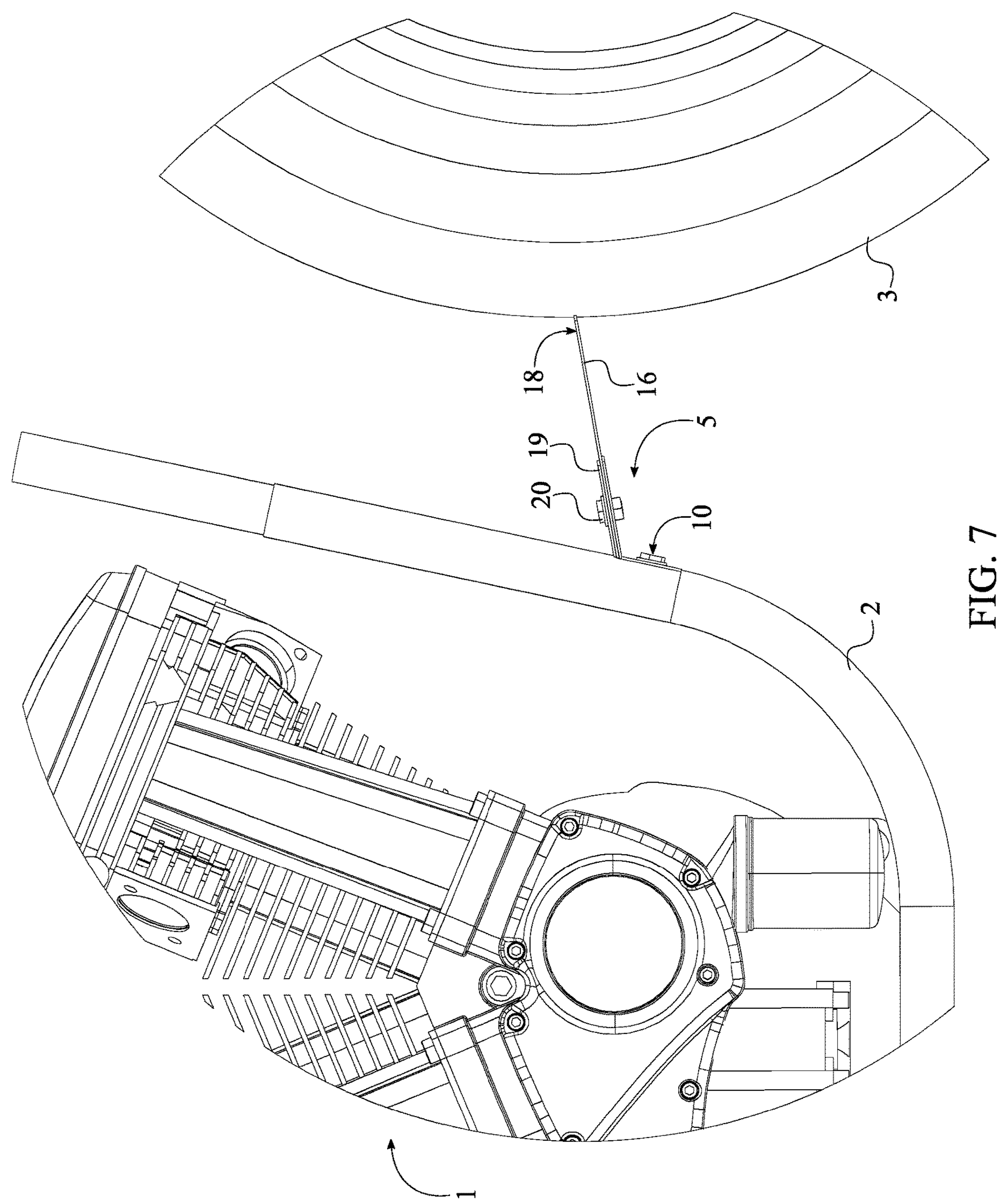
FIG. 7 is a detailed side view of the present invention, showing the attachment between the motorcycle and the front mudflap.

The frame attachment leg 7 is mounted to a frame 2 of the motorcycle 1 by the fastening mechanism 10 as shown in FIG. 7. The fastening mechanism 10 comprises a first hole 11, a second hole 12, a first fastener 13, and a second fastener 14 so that the frame attachment leg 7 can be mounted to the frame 2 of the motorcycle 1. In reference to FIG. 3, FIG. 5, and FIG. 6, the first hole 11 and the second hole 12 traverse through the frame attachment leg 7. The first hole 11 and the second hole 12 are linearly distributed along the frame attachment leg 7 in such a way that the first hole 11 is positioned adjacent to a first lateral edge 8 of the frame attachment leg 7, and the second hole 12 is positioned adjacent to a second lateral edge 9 of the frame attachment leg 7. The first fastener 13 is tensionally engaged with the frame 2 of the motorcycle 1 through the first hole 11. The second fastener 14 is tensionally engaged with the frame 2 of the motorcycle 1 through the second hole 12. As a result, the first fastener 13 and the second fastener 14 are able to secure the frame attachment leg 7 to the frame 2 of the motorcycle 1. Depending upon different types of frames 2, the first fastener 13 and the second fastener 14 can differ within the present invention. For example, when the frame 2 comprises a first female threaded opening and a second female threaded opening, the present invention utilizes a pair of threaded-male-fasteners as the first fastener 13 and the second fastener 14. As a result, the pair of threaded-male-fasteners is threadedly engaged with the first female threaded opening and the second female threaded opening thus securing the frame attachment leg 7 to the frame 2 of the motorcycle 1. When the first female threaded opening and the second female threaded opening are not present within the frame 2, the present invention utilizes a pair of mounting brackets as the first fastener 13 and the second fastener 14. As a result, the pair of mounting brackets tensionally engaged with the frame 2 of the motorcycle 1 thus securing the frame attachment leg 7.

In reference to FIG. 7, the front mudflap 4 positions in the horizontal manner with respect road surface in such a way that a distal end 18 the elastic shield 16 is positioned adjacent to a front wheel 3 of the motorcycle 1. In other words, the elastic shield 16 is extended in between the frame 2 and the front wheel 3 so that the elastic shield 16 is able to fully protect the rider from thrown debris that would otherwise be propelled upward by the front wheel 3 towards the rider's face endangering the rider's health and safety. Additionally, width of the front mudflap 4 can easily be adjusted to fit the size and width of the front wheel 3.

Although the invention has been explained in relation to its preferred embodiment, it is to be understood that many other possible modifications and variations can be made without departing from the spirit and scope of the invention as hereinafter claimed.

What is claimed is:

1. A front motorcycle mudflap system comprising:
a front mudflap;
a motorcycle;
the front mudflap comprises a bracket, an elastic shield, a support plate, and at least one fastener;
the bracket comprises a shield attachment leg, a frame attachment leg, and a fastening mechanism;
the elastic shield comprises a proximal end and a distal end, the proximal end being positioned in between the shield attachment leg and the support plate, the distal end being positioned adjacent to a front wheel of the motorcycle;
the elastic shield being mounted to the shield attachment leg and the support plate by the at least one fastener;
the frame attachment leg being mounted to a frame of the motorcycle by the fastening mechanism;
the at least one fastener comprises a male fastener and a female fastener;
the male fastener traversing through the elastic shield and the shield attachment leg from the support plate; and
the female fastener being tensionally engaged to the male fastener from the shield attachment leg;
wherein the elastic shield is sufficiently ridged that it remains parallel to the ground while being suspended by the bracket.

2. The front motorcycle mudflap system as claimed in claim 1, wherein the shield attachment leg being terminally connected to the frame attachment leg at an obtuse angle.

3. The front motorcycle mudflap system as claimed in claim 2, wherein the obtuse angle is 112 degrees.

4. The front motorcycle mudflap system as claimed in claim 1, wherein:
the fastening mechanism comprises a first hole, a second hole, a first fastener, and a second fastener;
the first hole and the second hole traversing through the frame attachment leg;
the first hole and the second hole being linearly distributed along the frame attachment leg;
the first hole being positioned adjacent to a first lateral edge of the frame attachment leg;
the second hole being positioned adjacent to a second lateral edge of the frame attachment leg;
the first fastener being tensionally engaged with the frame of the motorcycle through the first hole; and
the second fastener being tensionally engaged with the frame of the motorcycle through the second hole.

5. A front motorcycle mudflap system comprising:
a front mudflap;
a motorcycle;
the front mudflap comprises a bracket, an elastic shield, a support plate, and at least one fastener;
the bracket comprises a shield attachment leg, a frame attachment leg, and a fastening mechanism;
the shield attachment leg being terminally connected to the frame attachment leg at an obtuse angle;
the elastic shield being positioned in between the shield attachment leg and the support plate;
the elastic shield being terminally mounted to the shield attachment leg and the support plate by the at least one fastener;
the frame attachment leg being mounted to a frame of the motorcycle by the fastening mechanism;
the at least one fastener comprises a male fastener and a female fastener;
the male fastener traversing through the elastic shield and the shield attachment leg from the support plate; and
the female fastener being tensionally engaged to the male fastener from the shield attachment leg;

wherein the elastic shield is sufficiently ridged that it remains parallel to the ground while being suspended by the bracket.

6. The front motorcycle mudflap system as claimed in claim 5, wherein the obtuse angle is 112 degrees.

7. The front motorcycle mudflap system as claimed in claim 5, wherein:

the elastic shield comprises a proximal end and a distal end;

the proximal end being positioned in between the shield attachment leg and the support plate; and the distal end being positioned adjacent to a front wheel of the motorcycle.

8. The front motorcycle mudflap system as claimed in claim 5, wherein:

the fastening mechanism comprises a first hole, a second hole, a first fastener, and a second fastener;

the first hole and the second hole traversing through the frame attachment leg;

the first hole and the second hole being linearly distributed along the frame attachment leg;

the first hole being positioned adjacent to a first lateral edge of the frame attachment leg;

the second hole being positioned adjacent to a second lateral edge of the frame attachment leg;

the first fastener being tensionally engaged with the frame of the motorcycle through the first hole; and the second fastener being tensionally engaged with the frame of the motorcycle through the second hole.

9. A front motorcycle mudflap system comprising:

a front mudflap;

a motorcycle;

the front mudflap comprises a bracket, an elastic shield, a support plate, and at least one fastener;

the bracket comprises a shield attachment leg, a frame attachment leg, and a fastening mechanism;

the fastening mechanism comprises a first hole, a second hole, a first fastener, and a second fastener;

the shield attachment leg being terminally connected to the frame attachment leg at an obtuse angle;

the first hole and the second hole traversing through the frame attachment leg;

the first hole and the second hole being linearly distributed along the frame attachment leg;

the first hole being positioned adjacent to a first lateral edge of the frame attachment leg;

the second hole being positioned adjacent to a second lateral edge of the frame attachment leg;

the elastic shield being positioned in between the shield attachment leg and the support plate;

the elastic shield being terminally mounted to the shield attachment leg and the support plate by the at least one fastener;

the first fastener being tensionally engaged with a frame of the motorcycle through the first hole; and the second fastener being tensionally engaged with the frame of the motorcycle through the second hole;

wherein the elastic shield is sufficiently ridged that it remains parallel to the ground while being suspended by the bracket.

10. The front motorcycle mudflap system as claimed in claim 9, wherein the obtuse angle is 112 degrees.

11. The front motorcycle mudflap system as claimed in claim 9, wherein:

the elastic shield comprises a proximal end and a distal end;

the proximal end being positioned in between the shield attachment leg and the support plate; and the distal end being positioned adjacent to a front wheel of the motorcycle.

12. The front motorcycle mudflap system as claimed in claim 9, wherein:

the at least one fastener comprises a male fastener and a female fastener;

the male fastener traversing through the elastic shield and the shield attachment leg from the support plate; and the female fastener being tensionally engaged to the male fastener from the shield attachment leg.

* * * * *